United States Patent
Gangadharan et al.

(10) Patent No.: US 9,473,581 B2
(45) Date of Patent: Oct. 18, 2016

(54) INTEGRATED WEB-ENABLED SESSION BORDER CONTROLLER

(71) Applicant: Oracle International Corporation, Redwood Shores, CA (US)

(72) Inventors: Binod Pankajakshy Gangadharan, Bangalore (IN); Boris Selitser, Castro Valley, CA (US); Amitha Pulijala, Milpitas, CA (US); Honggang Frank Zhu, Roswell, GA (US); Karthic Loganathan, New Albany, OH (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 7 days.

(21) Appl. No.: 14/069,246

(22) Filed: Oct. 31, 2013

(65) Prior Publication Data

US 2014/0222963 A1  Aug. 7, 2014

Related U.S. Application Data

(63) Continuation-in-part of application No. 13/758,768, filed on Feb. 4, 2013.

(51) Int. Cl.
  *G06F 15/16* (2006.01)
  *H04L 29/08* (2006.01)
  *H04L 29/06* (2006.01)

(52) U.S. Cl.
  CPC ......... *H04L 67/141* (2013.01); *H04L 65/1016* (2013.01); *H04L 67/02* (2013.01); *H04L 69/321* (2013.01)

(58) Field of Classification Search
  CPC . H04L 1/1838; H04L 69/328; H04L 9/0855; H04L 12/2818
  USPC .......... 709/203, 217, 220, 239, 200
  See application file for complete search history.

(56) References Cited

U.S. PATENT DOCUMENTS 6,760,417 B1  7/2004 Wallenius
7,136,913 B2  11/2006 Linderman
(Continued)

FOREIGN PATENT DOCUMENTS

WO   2014007708   1/2014

OTHER PUBLICATIONS

Bea, WebLogic Network Gatekeeper, Architectural Overview, Version 3.0, Sep. 2007, 112 pages.
(Continued)

*Primary Examiner* — El Hadji Sall
(74) *Attorney, Agent, or Firm* — Tucker Ellis LLP

(57) ABSTRACT

The present invention provides a system and method for real-time communication signaling between HTML5 endpoints and between HTML5 endpoints and the IMS Core of a telecommunications network. The method adapts complex signaling on the server-side into simple operations towards the Web. In an embodiment the system includes an integrated web-enable session border controller (WSBC) including a network-side controller/a signaling engine, a media gateway and a client-side controller. The client-side controller provides a JavaScript API to encapsulate the signaling layer. The WSBC also includes session border control functionality, terminates Internet domain communications with the client-side, parses, and normalizes the Internet domain communications into an internal protocol suitable for communication with telecommunications network systems. The system thereby provides a dedicated signaling channel with the network-side controller for applications on the client to interact with telecommunications network services.

20 Claims, 6 Drawing Sheets

(56) References Cited

U.S. PATENT DOCUMENTS

| | | | |
|---|---|---|---|
| 7,483,438 B2 | 1/2009 | Serghi et al. | |
| 7,716,240 B2* | 5/2010 | Lim | 707/781 |
| 8,060,604 B1 | 11/2011 | Breau | |
| 8,185,548 B2* | 5/2012 | Lim | 707/781 |
| 8,296,409 B2* | 10/2012 | Banerjee et al. | 709/223 |
| 8,630,299 B1 | 1/2014 | Afshar | |
| 9,038,082 B2* | 5/2015 | Maes | 718/104 |
| 2002/0025795 A1 | 2/2002 | Sharon et al. | |
| 2003/0028790 A1 | 2/2003 | Bleumer et al. | |
| 2004/0009762 A1 | 1/2004 | Bugiu et al. | |
| 2005/0245230 A1 | 11/2005 | Benco et al. | |
| 2005/0262075 A1* | 11/2005 | Beartusk et al. | 707/8 |
| 2006/0248198 A1 | 11/2006 | Galchev | |
| 2007/0106801 A1 | 5/2007 | Jansson | |
| 2007/0143470 A1 | 6/2007 | Sylvain | |
| 2007/0156659 A1* | 7/2007 | Lim | 707/3 |
| 2008/0103923 A1 | 5/2008 | Rieck et al. | |
| 2008/0189421 A1 | 8/2008 | Langen | |
| 2008/0271113 A1 | 10/2008 | Belling | |
| 2009/0141704 A1* | 6/2009 | Eng et al. | 370/352 |
| 2009/0225760 A1 | 9/2009 | Foti | |
| 2009/0265607 A1* | 10/2009 | Raz et al. | 715/233 |
| 2009/0268715 A1 | 10/2009 | Jansson | |
| 2010/0114994 A1* | 5/2010 | Huang et al. | 707/811 |
| 2010/0142515 A1* | 6/2010 | Jana et al. | 370/352 |
| 2010/0183131 A1* | 7/2010 | Chang | 379/93.12 |
| 2010/0223287 A1* | 9/2010 | Lim | 707/769 |
| 2011/0072144 A1 | 3/2011 | Fikouras | |
| 2011/0082920 A1 | 4/2011 | Bhattacharya et al. | |
| 2011/0107156 A1* | 5/2011 | Miyata et al. | 714/49 |
| 2011/0209181 A1* | 8/2011 | Gupta et al. | 725/62 |
| 2011/0258305 A1* | 10/2011 | Chen et al. | 709/223 |
| 2011/0258597 A1* | 10/2011 | Chen et al. | 717/107 |
| 2012/0016932 A1* | 1/2012 | de Castro et al. | 709/203 |
| 2012/0045040 A1* | 2/2012 | Maes | 379/67.1 |
| 2012/0072548 A1 | 3/2012 | Kim | |
| 2012/0144416 A1* | 6/2012 | Wetzer et al. | 725/14 |
| 2012/0151373 A1 | 6/2012 | Kominac | |
| 2012/0178420 A1* | 7/2012 | Ould | 455/411 |
| 2012/0233216 A1* | 9/2012 | Lim | 707/781 |
| 2012/0317474 A1* | 12/2012 | Parreira | 715/234 |
| 2013/0013804 A1* | 1/2013 | Traynor | 709/232 |
| 2013/0042152 A1* | 2/2013 | Fryc et al. | 714/38.1 |
| 2013/0058262 A1* | 3/2013 | Parreira | 370/276 |
| 2013/0067333 A1* | 3/2013 | Brenneman | 715/721 |
| 2013/0073393 A1* | 3/2013 | Nasr | 705/14.58 |
| 2013/0094445 A1* | 4/2013 | De Foy et al. | 370/328 |
| 2013/0097239 A1 | 4/2013 | Brown | |
| 2013/0104030 A1* | 4/2013 | Parreira | 715/234 |
| 2013/0232217 A1 | 9/2013 | Kristiansson | |
| 2014/0007083 A1* | 1/2014 | Baldwin et al. | 717/178 |
| 2014/0026120 A1* | 1/2014 | Gu et al. | 717/124 |
| 2014/0040437 A1* | 2/2014 | Mitsuya et al. | 709/219 |
| 2014/0044123 A1* | 2/2014 | Lawson et al. | 370/352 |
| 2014/0075472 A1* | 3/2014 | Mitsuya et al. | 725/32 |
| 2014/0095724 A1 | 4/2014 | Yoakum | |
| 2014/0126714 A1* | 5/2014 | Sayko | 379/265.09 |
| 2014/0156725 A1 | 6/2014 | Mandyam | |
| 2014/0181949 A1 | 6/2014 | Hunter | |
| 2014/0195588 A1* | 7/2014 | Badge et al. | 709/203 |
| 2014/0280522 A1 | 9/2014 | Watte | |
| 2015/0022619 A1* | 1/2015 | Aleixo Dinis Lopes et al. | 348/14.02 |
| 2015/0195309 A1 | 7/2015 | Opsenica | |

OTHER PUBLICATIONS

Chen et al., Applying SOA and Web 2.0 to Telecom: Legacy and IMS Next-Generation Architectures, IEEE, 2008, 6 pages.

Oracle, Oracle Communication Services Gatekeeper Concepts and Architectural Overview, Release 4.1, Jan. 2009, 94 pages.

United States Patent and Trademark Office, Office Action Dated May 19, 2016 for U.S. Appl. No. 14/069,263, 17 Pages.

United States Patent and Trademark Office, Office Action Dated Jun. 9, 2016 for U.S. Appl. No. 14/069,236, 14 Pages.

Ericson, et al., JSR 309 Overview of Media Server Control API, Version: Media Server Control API v1.0, Sep. 30, 2009, 87 pages, Hewlett-Packard Development Company, L.P.

Kulkarni, et al., SIP Servlet Specification, Version 1.1, JSR 289 Expert Group, Aug. 1, 2008, 240 pages, BEA Systems, Inc.

United States Patent and Trademark Office, Office Action Dated July 18, 2016 for U.S. Appl. No. 13/758,768, 25 Pages.

* cited by examiner

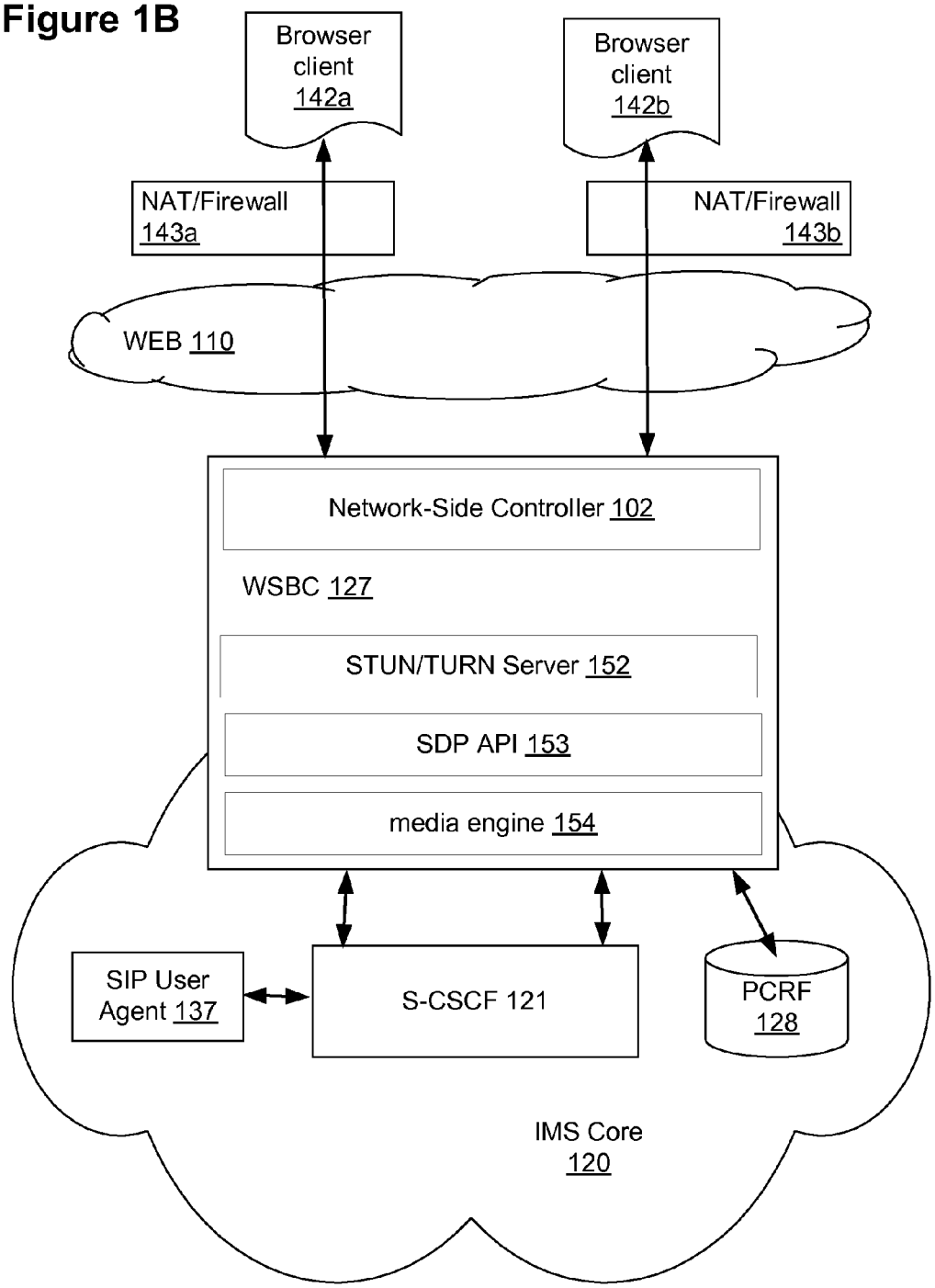

INTEGRATED WEB-ENABLED SESSION BORDER CONTROLLER

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CLAIM OF PRIORITY

This patent application is a continuation-in-part continuation of U.S. patent application Ser. No. 13/758,768, entitled "Real-Time Communication Signaling Gateway" filed Feb. 4, 2013 (Inventors: Honggang frank Zhu, Boris Selitser, and Karthic Loganathan), which application is incorporated herein by reference in its entirety.

RELATED CASES

This patent application is related to the following patent applications, which are hereby incorporated by reference in their entirety:

U.S. Patent Application titled "SYSTEM AND METHOD FOR EXTENDING IP MULTIMEDIA SUBSYSTEM TO HTML5 ENVIRONMENTS", application Ser. No. 14/069,214, filed Oct. 31, 2013;

U.S. Patent Application titled "JAVASCRIPT API FOR WEBRTC", application Ser. No. 14/069,236, filed Oct. 31, 2013;

U.S. Patent Application titled "BROWSER/HTML FRIENDLY PROTOCOL FOR REAL-TIME COMMUNICATION SIGNALING", application Ser. No. 14/069,308, filed Oct. 31, 2013;

U.S. Patent Application titled "GENERIC MODEL FOR CUSTOMIZING PROTOCOL BEHAVIOR THROUGH JAVASCRIPT", application Ser. No. 14/069,297 filed Oct. 31, 2013; and U.S. Patent Application titled "JAVA API FOR PROGRAMMING WEB REAL-TIME COMMUNICATION APPLICATIONS", application Ser. No. 14/069,263, filed Oct. 31, 2013.

FIELD OF THE INVENTION

The present invention relates to a system and method for extending telecommunications networks to the Web environment. In particular, the present invention relates to extending IP Multimedia Subsystem as utilized by telecommunications networks, to the web environment.

BACKGROUND

With the explosive proliferation of IP-enabled mobile and fixed devices capable of offering Web, telecom and entertainment services, such as 3G/4G-enabled smart phones, TVs, home appliances, gaming consoles, and automobiles, among others, operators of mobile, broadband and fixed networks are faced with the operational and business challenges of delivering innovative IP-based communication services with maximum profitability. In order to achieve this goal, customers are increasingly migrating away from expensive, closed, proprietary and application-specific legacy platforms, and towards low-cost, open, standards-based unified converged application platforms, which dramatically lower the time and cost of adding new features and extensions to existing IP-based communication services.

Session Initiation Protocol (SIP) is a control (signaling) protocol developed to manage interactive multimedia IP sessions including IP telephony, presence, and instant messaging. SIP is widely used in telecommunication networks. SIP and other communications centric protocols are complex, and their implementation requires significant domain expertise. However, SIP is not readily compatible with HTTP and use in the Internet domain.

The IP Multimedia Subsystem (IMS) is an architecture for an integrated network of telecommunications carriers that would facilitate the use of IP (Internet Protocol) for packet communications in all known forms over wireless or landline. Examples of such packet communications include traditional telephony, fax, e-mail, Voice over IP (VoIP), instant messaging (IM), videoconference sessions and video on demand (VoD). IMS uses a Voice-over-IP (VoIP) and runs over the standard Internet Protocol (IP). IMS gives network operators and service providers the ability to control and charge for each service. IMS architecture has the capability to support existing phone systems (both packet-switched and circuit-switched). Thus, IMS provides the interoperability, security, session management and QoS capabilities that telecommunications providers lack and desire. IMS is the de facto standard for next-generation networks.

HyperText Markup Language (HTML) is the main markup language for creating web pages and other information that can be displayed in a web browser. HTML is written in the form of HTML elements consisting of tags. HTML elements form the building blocks of all websites. HTML allows images and objects to be embedded and can be used to create interactive forms. It provides a means to create structured documents by denoting structural semantics for text such as headings, paragraphs, lists, links, quotes and other items. It can embed scripts written in languages such as JavaScript which affect the behavior of HTML web pages. The purpose of a web browser is to read HTML documents and compose them into visible or audible web pages. The HTML environment has a well known behavior according to standards established by the World Wide Web Consortium (W3C) which is the main international standards organization for the World Wide Web (abbreviated WWW or W3).

HTML5 introduced WebRTC application programming interfaces (APIs) that make it possible for applications that use JavaScript in an HTML5 environment to take part in real-time communications. To make use of this capability, applications that reside in the browser environment of one user need to exchange messages with another application to establish media connections. However, the signaling process of exchanging and negotiating session information is not specified by W3C and is left to the application to implement. The problem is more complicated if it is desired to make a connection with a non-browser media endpoint like a traditional telephony equipment.

It would be desirable provide access to the network services made available in the IP Multimedia Subsystem (IMS) from the HTML environment, and in particular, the HTML environments capable of real-time communication environment, for example HTML5. However extending IMS architecture to the HTML environment is difficult owing to incompatibility of SIP with HTTP over TCP/IP and the requirement for domain expertise to overcome such incompatibility. There is presently no simple way to extend the network services of the IP Multimedia Subsystem (IMS) to HTML5 applications without radical changes to the IMS model and custom extensions to the HTML platform to permit a browser to be used as an endpoint for IMS services. Thus, despite the desire to extend the enhanced capabilities that IMS provides to the HTML environment, such integration has not been readily feasible.

It would therefore be desirable to provide a system and method for extending IMS architecture to the HTML environment which is effective and simple to implement.

It would further be desirable to provide a system and method for extending IMS architecture to the HTML environment without radical changes to the IMS model or custom extensions to the HTML platform.

It would further be desirable to provide a system and method for extending IMS architecture to the HTML environment which can be implemented without domain expertise.

It would still further be desirable to provide a system and method for extending IMS architecture to the HTML environment while also providing border gateway functionality at the edge of the IMS architecture network.

SUMMARY

The present invention provides a system and method for extending IMS architecture to the HTML environment which overcomes the limitations of the state of the art.

The present invention provides a system and method for extending IMS architecture to the HTML environment which is effective and simple to implement.

The present invention provides a system and method for extending IMS architecture to the HTML environment without radical changes to the IMS model or custom extensions to the HTML platform.

The present invention provides a system and method for extending IMS architecture to the HTML environment which can be implemented without domain expertise.

The present invention provides a system and method for extending IMS architecture to the HTML environment utilizing an integrated web-enabled session border controller (SBC) at the edge of the IMS architecture network.

In an embodiment, the system and method of the present invention provide a communication channel between an HTML-capable application or operating system and the IMS core of a telecommunications network utilizing an integrated web-enabled session border controller (WSBC), for example ORACLE™ WebRTC Session Controller (WSC), at the edge of the IMS architecture network. The system and method overcome the need for domain expertise of complex SIP and other communications centric protocols. The system and method provides a mechanism to combine complex signaling in the IMS telecommunications network into simple operations towards the Web. The present invention thereby provides a platform which enables telecommunications providers to provide a better end-to-end customer experience accessible from a wide variety of HTML-capable consumer devices.

In an embodiment, the system and method of the present invention comprise a client-side controller, integrated web-enabled session border controller (WSBC) including a network-side controller, and a communications protocol for communicating between the client-side controller and the network-side controller. The client-side controller provides client-side JavaScript APIs to interface with the HTML-capable application or operating system and encapsulate the HTTP signaling layer. The network-side controller component of the WSBC terminates the communications with the client-side, and parses and normalizes the communications into an internal protocol suitable for communication with IMS within legacy telecommunications network systems (for example XMPP, SIP, and the like). The communications protocol provides a communication channel which is compatible with transmission over the Internet domain. The WSBC provides session border control functionality with integrated web-enabled communication provided by the network-side controller. In combination, the system and method provides session border control and border gateway function at the edge of the IMS network while simultaneously providing a dedicated "signaling" channel for all the applications on an HTML client to interact with the IMS of telecommunications network services.

Other objects and advantages of the present invention will become apparent to those skilled in the art from the following detailed description of the various embodiments, when read in light of the accompanying drawings.

BRIEF DESCRIPTION OF THE DRAWINGS

FIG. 1B shows aspects of the WSBC of the system for extending IP Multimedia Subsystem to HTML environments of FIG. 1A according to an embodiment of the present invention.

DETAILED DESCRIPTION

Figure 1A:
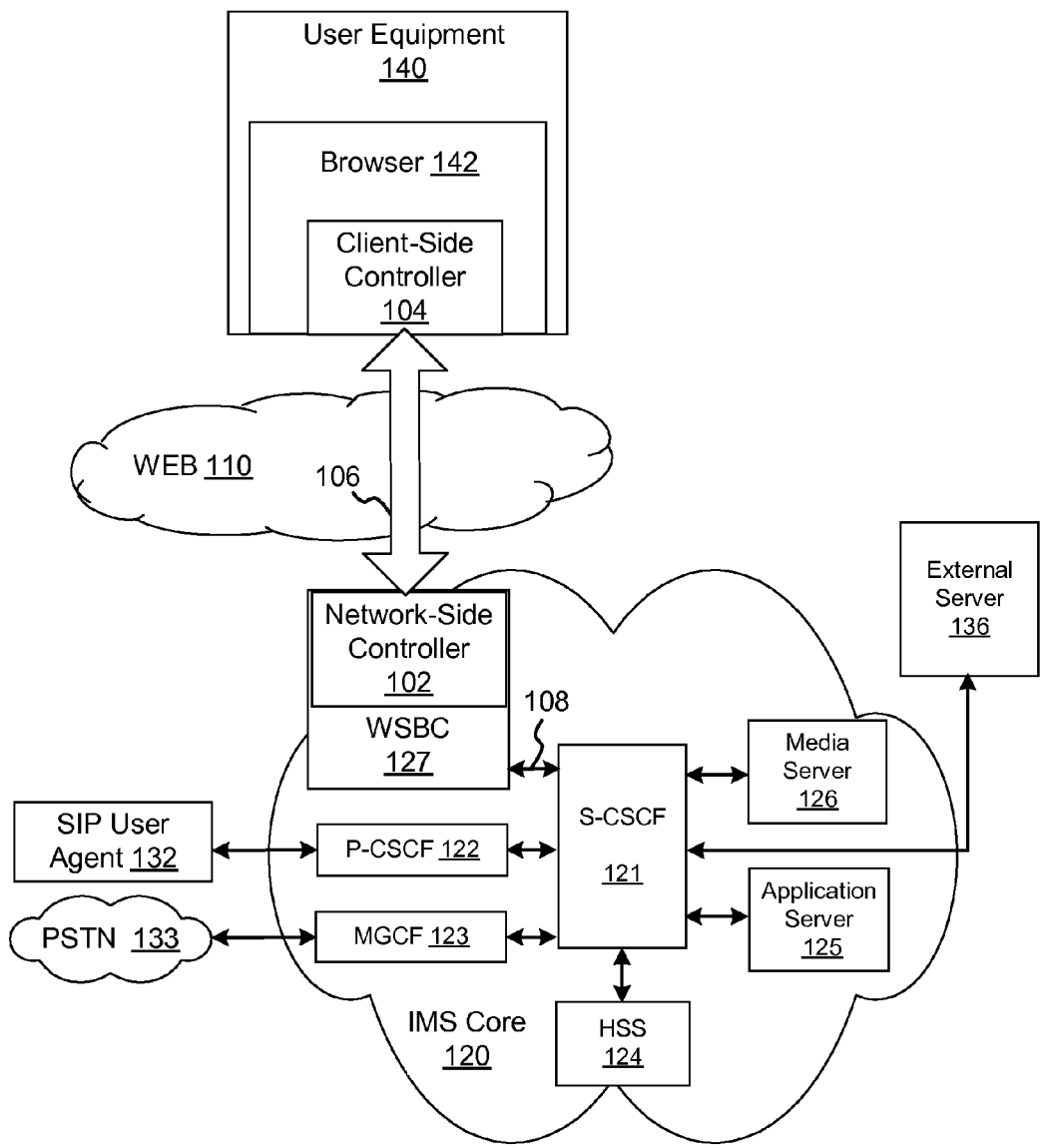
FIG. 1A shows an overview of a system for extending IP Multimedia Subsystem to HTML environments including a WSBC according to an embodiment of the present invention.

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

Common reference numerals are used to indicate like elements throughout the drawings and detailed description; therefore, reference numerals used in a figure may or may not be referenced in the detailed description specific to such figure if the element is described elsewhere. The first digit in a three digit reference numeral indicates the series of figures in which the element first appears.

FIG. 1A shows an overview of a system and method for extending IP Multimedia Subsystem to HTML environments while utilizing an integrated web-enabled session border controller (WSBC) at the edge of the IMS architecture network according to an embodiment of the present invention. As shown in FIG. 1A, the system and method comprises a client-side controller 104, an integrated web-enabled session border controller (WSBC) 127 which includes a network-side controller 102, and a communications protocol 106 for communicating between the client-side controller 104 and the network-side controller 102. The client-side controller 104, operating on User equipment 140, provides a client-side JavaScript API to encapsulate the HTTP signaling layer. The network-side controller 102 terminates the Internet domain communications with the client-side, and parses and normalizes the Internet domain communications into an internal protocol 108 suitable for communicating with elements of the IMS Core 120 within legacy telecommunications network systems (for example XMPP, SIP, and the like). WSBC 127 integrates web-capable network-side controller 102 as well as providing session border control and border gateway functionality. The communications protocol 106 provides a communication channel which is compatible with communications over the Internet domain 110. The system and method thereby provides border control and border gateway functionality at the edge of the IMS Core 120 as well as providing a dedicated "signaling" channel for the HTML-capable applications/operating system on the User Equipment 140 to interact with the IMS Core 120 of the telecommunications network.

A session border controller (SBC) is a system used in networks to exert control over the signaling and media streams. It is involved in setting up, conducting, and tearing down telephone calls or other interactive media communications. An SBC, by exerting influence of the data streams traversing the border of the network can perform functions including Security (e.g. protecting the network and devices from malicious attacks, fraud, and malformed packets, topology hiding and encryption); Connectivity (e.g. facilitate network communication by NAT traversal, SIP normalization, and VPN connectivity); Quality of Service (QoS policy can be implemented in an SBC including traffic policing, resource allocation, rate limiting, call admission control, measurement of call statistics and quality; regulatory like lawful interception, media trans-coding, P-CSCF functionality, etc. For example, in order to hide the network topology and protect the service provider or enterprise packet network, an SBC can terminate a received call leg, and initiate a second call leg to the destination party. In technical terms, when used within the SIP protocol, this is defined as being a back-to-back user agent (B2BUA). The effect of this behavior is that not only the signaling traffic, but also the media traffic (voice, video) can be controlled by the SBC. SBCs are inserted into the signaling and/or media paths between calling and called parties in a VoIP call, predominantly those using the Session Initiation Protocol (SIP), H.323, and MGCP call-signaling protocols. For example a conventional SBC (not shown) may be associated with P-CSCF 122 of FIG. 1A, which is the entry point for the SIP endpoints.

From an IMS network perspective, network-side controller 102 sits in the edge of IMS core 120 and is architecturally parallel to a P-CSCF. While P-CSCF is the entry point (many times along with a Session Border Controller) for the SIP endpoints, network-side controller 102 serves as the entry point for HTML5 endpoints. It is advantageous to integrate border control and border gateway functionality and web-enabled network-side controller 102 into an integrated Web-enabled Session Border Controller (WSBC) 127 to provide session border control functionality at the entry point for HTML5 endpoints. WSBC 127 can provide conventional functionality of an SBC (including Security; Connectivity; Quality of Service and regulatory functions) and, in addition, new functions including: 1) handling HTTP\WebSocket signaling traffic and potentially relaying it to a telecom protocol; 2) interoperating with media technologies used by WebRTC like TURN, when some participants in the communication may not be using WebRTC; and 3) handling the media security and operating as a gateway between WebRTC HTML5 clients and non-HTML5 clients.

In an embodiment of the invention, WSBC 127 can allow network operators to manage WebRTC communications that are made on their networks, fix or change protocols and protocol syntax to achieve interoperability, and also overcome some of the problems that firewalls and network address translators (NATs) present for WebRTC communications. As a centralized network element, WSBC 127 can act as a STUN/TURN server, or provide other techniques for media communication from the HTML5 applications to help them traverse NAT and firewall per the ICE procedure; and also act an interactive connection establishment (ICE) gateway to SIP user agents that communicate with HTML applications, terminating the ICE negotiation and Secure Real-time Transport Protocol (SRTP) communication from HTML5 applications as appropriate.

Referring again to FIG. 1A, IMS Core 120 (IP Multimedia Subsystem or IP Multimedia Core Network Subsystem) is an architectural framework for delivering IP multimedia services. As shown in FIG. 1A IMS Core 120 comprises: S-CSCF 121; P-CSCF 122; Media gateway controller function (MGCF) 123; HSS 124; Application Server 125; and Media Server 126. These elements are shown as an example of conventional IMS architecture. IMS Core 120 may contain additional and/or different elements depending upon the implementation of a particular network. The present invention is not limited to any particular implementation of IMS Core 120. Indeed, it is a feature of the present invention that it extends whatever features are present in IMS Core to the Internet domain.

To ease the integration with the Internet, IMS uses IETF protocols wherever possible, e.g., Session Initiation Protocol (SIP). IMS Core 120 includes network elements designed to interact with SIP User Agents 132 and PSTN 133. As used herein, a user agent is an SIP endpoint that can be considered anything that either originates or terminates a SIP session, e.g., SIP Phones, Soft Phones, and the like. Typically such devices must be specifically designed to implement SIP in order to function as SIP User Agents 132. In addition the IMS Core 120 can exchange signaling and media messages with a public switched telephone network (PSTN) 133. IMS Core 120 facilitates access to multimedia and voice applications from wireless and wireline terminals to create a form of fixed-mobile convergence (FMC). This is done by having a horizontal control layer that isolates the access network from the service layer. From a logical architecture perspective, services need not have their own control functions, as the control layer is a common horizontal layer.

Referring again to the IMS Core 120 shown in FIG. 1A, P-CSCF 122, represents the proxy call session control function which is an entry point for a SIP user agent 132, and authenticates users and establishes IP security integration with the SIP user agent 132. Media gateway controller function (MGCF) 123 is the entry point for signaling and media messages transmitted via public switched telephone network (PSTN) 133. MGCF 123 and P-CSCF 122 are used to process ingoing and outgoing SIP signaling packets in the IMS Core 120. On the network-side, MGCF 123 and P-CSCF 122 interact with S-CSCF 121 using Session Initiation Protocol (SIP).

S-CSCF 121 is the central node of the signaling plane. It is a SIP server, but also performs session control. S-CSCF 121 is located in the home network. It uses Diameter Cx and Dx interfaces to the Home Subscriber Server (HSS) 124 to download user profiles and upload user-to-S-CSCF associations. All necessary subscriber profile information is loaded from the HSS 124. S-CSCF 121 inspects every message from the SIP user agent 132 and/or other network elements, and decides where the SIP message should be forwarded for service provision. An Application Server 125 hosts and executes services, and interfaces with the S-CSCF 121 using SIP. Additionally a media server 126 provides media related functions such as media manipulation, e.g. voice stream mixing and interfaces with the S-CSCF 121 using SIP. S-CSCF 121 may also allow for provisioning of services and/or media services from an external server 136.

As described above, the elements of IMS Core 120 communicate with the central node of the signaling plane S-CSCF 121 using Session Initiation Protocol (SIP) (alternative session-oriented protocols may also be used, including for example XMPP). However SIP is not easily compatible with conventional protocols for transmission over the Web 110. Integration of IMS Core 120 is therefore difficult owing to incompatibility of protocols used in the two different environments and the requirement for domain expertise to overcome such incompatibility. The present invention provides a solution to such problems and therefore allows for extending the IMS Core 120 to the Web 110.

Network-side controller 102 is an entry point for HTTP traffic from Web 110. Network-side controller 102. According to an embodiment of the present invention network-side controller 102 is and integrated part of WSBC 127 which implements session border controller/border gateway functionality at the edge of IMS Core 120. Network-side controller 102 terminates Internet domain communications with the client-side, and parses and normalizes the Internet domain communications into an internal protocol 108 suitable for communicating with elements of the IMS Core 120 (e.g. S-CSCF 121) within legacy telecommunications network systems (for example XMPP, SIP, and the like). Network-side controller 102 has the ability to leverage applications in the IMS application server 125 instead of hosting a separate/custom business application on its own thus greatly simplifying integration with IMS Core 120. Network-side controller 102 communicates with client-side controller using a protocol 106 adapted to meet the real-time signaling requirements of SIP while remaining compatible with transmission over Web 110.

The client-side controller 104 operating on User equipment 140 provides a client-side JavaScript API to interface with HTML-capable applications/operating systems and encapsulate the HTTP signaling layer. The system and method 100 thereby provides a dedicated "signaling" channel for all the HTML-capable applications/OS on the User Equipment 140 to interact with the IMS Core 120 of the telecommunications network.

User equipment 140 represents any HTML-capable device, including for example computing devices such as personal computers, laptops, desktops, notebooks, netbooks, tablets, mobile phones, and e-book readers. Moreover, HTML capabilities are being added to consumer devices, such as appliances, automobiles, set-top boxes, amplifiers, audio-visual components, televisions, projectors, and the like. HTML capabilities may be provided by a browser, for example, Safari, Firefox, Chrome Browser, and Internet Explorer. Alternatively, HTML capabilities may be a core component of the operating system, for example Chrome OS.

FIG. 1B shows aspects of integrated Web-enabled Session Border Controller 127 (WSBC) forming a part of the system for extending IP Multimedia Subsystem to HTML environments of FIG. 1A according to an embodiment of the present invention. WSBC 127 combines the functionalities of a signaling engine, a media gateway, and an SBC, into one network edge element. A Media engine function 154 of WSBC 127 can also handle media trans-coding and media stream functions, e.g., echo cancellation. Consolidating all the above functionalities in one network element simplifies deployment for telecommunications operators.

Network-Side Controller 102 of WSBC 127 can be implemented as a signaling engine, which acts as a signaling server to support communications between browser clients 142a, 142b, and communications between the browser clients 142a, 142b and a non-browser client, e.g., SIP User Agent 137. The Network-Side Controller 102 can handle web signaling messages that come from the browser clients, e.g., browser clients 142a, 142b, and the non-web signaling messages that come from the non-browser clients, e.g., SIP User Agent 137. Network-Side Controller 102 can also act as a cross-protocol gateway that translates between the web signaling messages and the non-web signaling messages.

As shown in FIG. 1B, NAT/Firewalls 143a, 143b are deployed to provide private addresses (combinations of IP and ports) of applications behind the NAT/Firewalls 143a, 143b and to keep out malicious attackers. In order for applications in the two browser clients 142a, 142b to establish a connection, traffic needs to be passed between public addresses exposed by the NAT/Firewalls 143a, 143b and the private addresses of the browser clients 142a, 142b (NAT traversal).

Interactive Connectivity Establishment (ICE) defines a mechanism for NAT traversal by providing a set of candidate transport addresses for each media stream, which are then validated with peer-to-peer connectivity checks using Session Traversal Utilities for NAT (STUN) and/or Traversal Using Relays around NAT (TURN). STUN is a standardized set of methods and a protocol which allows a client behind a network address translator (NAT)/firewall to ask a STUN server on the public internet about its IP address and port which may be used by a remote peer. However, addresses obtained by STUN may not be usable by all peers, depending on the topological conditions of the network. TURN is a protocol that allows a client to obtain a transport address from which it can receive media from any remote peer.

In an embodiment of the invention, the WSBC 127 can provide STUN/TURN server function 152 to the browser clients 142a, 142b, helping them traverse NAT/Firewall 143a, 143b per the ICE procedure. For example STUN/TURN Server Function 152 of WSBC 127 can provide a transport address using TURN. Additionally, STUN/TURN Server Function 152 can be configured to modify the signaling messages between the browser clients 142a, 142b to remove non-TURN candidates from the session description (SDP) information and force media streams of certain calls to go through the Network-side Controller 102 instead of taking a pure browser to browser route. This assists in enforcing lawful interception in certain deployments.

In an embodiment of the invention, before sending out a START message to initiate a request for a call to the browser client 142b, the browser client 142a needs to discover candidate IP addresses and ports that the browser 142b can use to send data to the browser client 142a. The candidates can include local candidates (host candidates), reflexive candidates from a STUN/TURN Server Function 152, and relay candidates from STUN/TURN Server Function 152. The START message can then be sent, with the candidates in the body SDP block of the message. The browser client 142b can come up with its own candidates for the browser client 142a to send data to. After receiving the candidates from the browser client 142b, the browser client 142a can start testing and building a matrix with possible media channels. After both browser clients agree on the IP, protocol and port combinations, they can create a media channel to transfer media information between them using e.g. a Real-time Transport Protocol (RTP) or Secure Real-time Transport Protocol (SRTP).

In an embodiment of the invention, the communication between the browser client 142b and the SIP user agent 137 can take similar steps except that the web protocol message from the browser client 142b would be converted into a legacy protocol, e.g., SIP, at the edge of IMS Core 120, and that the media engine 154 can terminate SRTP communication from the browser client 142b as needed. For example, a service provider may have rules and policies to terminate SRTP communication and convert the communication into RTP by manipulating the parameters of the SDP using an API provided by WSBC 127, so that the communication can be integrated with non-SRTP capable PSTN gateways or endpoints. For example, the communication from the browser 142b may be encrypted using SRTP, and the SIP user agent 137 may not be SRTP capable. In this situation, the Network-Side Controller 102 can terminate the communication, decrypt it, translate it into SIP messages, and send the SIP messages to the SIP user agent 137 using RTP. In an embodiment of the invention, a control protocol, e.g., Json-RTC, is implemented within WSBC 127 to enable STRP termination.

In an embodiment of the invention, the Media Gateway 154 can act as an ICE gateway between the SIP user agent 137 and the browser client 142B. It can terminate the ICE negotiation from the browser client 142B. For example, some SIP user agents within an IMS network domain, e.g., the SIP user agent 137, do not support ICE, which requires support for ICE for the protocol to work. Acting as an ICE gateway, the Media engine 154 can determine that the SIP user agent 137 does not support ICE, and terminate the ICE negotiation from the browser client 142b. However, alternatively, the Media Gateway 154 can act as an ICE agent for the browser 142b on one side, and a non-ICE agent for the SIP user agent 137 on the other side, thus enabling a call from the browser 142b to the SIP user agent 137 to make use of ICE.

WSBC 127 can be configured to register an application with an external SIP registrar. WSBC 127 is also configurable to act as a registrar for SIP clients. On the web side, it is very common for browsers/UA to be behind NAT (Network Address Translation devices). NATs allow a number of devices to share an IP address. ICE is a standard protocol for establish connection between endpoints behind NAT. For example, Browser Client 142a behind NAT/Firewall 143a trying to connect with SIP User Agent 137 (behind WSBC 127) will gather potential address candidates local address, reflexive address and relay address (from STUN/TURN Server 152), these candidates are prioritized and encoded in a=candidate lines in the SDP.

Registration Scenario 1. Browser Client 142a logs in; The HTTP GET request sent by the web browser for the Web-Socket handshake includes a Cookie [RFC6265] header with the value previously retrieved after the successful web login procedure. The Cookie value is then inspected by the WebSocket server for authorizing the connection. Once the WebSocket connection is established, the Client sends in a CONNECT request. WSBC 127 acts as a SIP outbound proxy [RFC 5626] and the SIP Registrar is behind the outbound proxy. WSBC 127 adds the header and contact header to the request it sends to the SIP Registrar.

Registration Scenario 2. In case the user is associated with multiple devices, all the devices are referenced by the same AOR, in this context, it is desirable to have an identifier which addresses a single device (UA) rather than a group of UAs with an AOR (Address of Record). A device identifier (URI), as mentioned in RFC 5626 (section 4.1) shall be generated by the client web app running in the browser the first time it loads the JavaScript API, and then it is stored as a Cookie within the browser (this can also be the websocket connection identifier). This instance specific, URI is mapped as GRUU[RFC 5627] by the WSBC 127, identifies a specific user agent where the user is signed on. The following is an example of a Registration Message.

REGISTER sips:bob@example.com SIP/2.0
Via: SIP/2.0/UDP client.example.com:5060; branch=z9hG4bK74bf9
Max-Forwards: 70
From: Bob <sips:bob@example.com>; tag=hG4bK74b
To: Bob <sips:bob@example.com>
Call-ID: a84b4c76e66710@example.com
CSeq: 1 REGISTER
Supported: outbound, gruu
Contact: <sips:bob@example.com>; +sip.instance= "<urn:uuid:f81-7dec-14a06cf1>"
Content-Length: 0

Registration Scenario 3. In case of SIP clients, WSBC 127 acts as an outbound edge proxy and includes a path header, [RFC3327] so that when the proxy/registrar later forwards a request to this UA, the request is routed through the edge proxy of WSBC 127.

The SDP information contains the description of what to transmit to the remote side as well as how to handle the media received. For example, the list of codecs sent to a remote party indicates what the local side is willing to decode and what the remote party should send. In an embodiment of the invention, WSBC 127 can modify the Session Description Protocol (SDP) information of signaling messages. WSBC 127 provides SDP API 153 which enables SDP information to be updated at WSBC 127 layer on the way to/from Browser Client 142a if needed. WSBC 127 is operative to allow configuration of SDP information at the application level. For example: all the traffic from a specific application can have a selected media parameter added to the SDP information. Modification of SDP information by WSBC 127 is useful for lawful interception; ICE termination; security conversion; optimizing ICE candidate selection; forcing codec choice and compatibility based on destination capabilities and optimal cost; updating desired bandwidth attributes for each stream; and media transcoding.

In an embodiment of the invention, the WSBC 127 provides Application Programming Interfaces, SDP API 153, for manipulating individual lines as well as entire media descriptions in a SDP. The session description consists of a session-level description (details that apply to the whole session and all media streams) and optionally several media-level descriptions (details that apply to a single media stream). SDP API 153 provides the capability to modify both the session-level description as well as the media level descriptions. For example, SDP API 153 allows the operator to add, modify, remove and insert an SDP parameter at both the session level and the media level. For example, of SDP modification at the media level, SDP API 153 allows a operator to remove lines "a=ptime:20" from the audio media description only at the specified media level. The following is a sample list of SDP parameters configurable using SDP API 153 of WSBC 127.

- remove or reorder codecs (m=);
- remove or reorder ICE candidates (a=candidate);
- change codec attributes (a=fmtp; ptime);
- enable/disable RTCP mux (a=rtcp-mux);
- remove or reorder DTLS fingerprints (a=dtls);
- change SRTP parameters or keys (a=crypto);
- remove RTP header extensions (a=rtphdr-ext); and
- change ICE ufrag/password (a=ice-ufrag/pwd).

SDP API 153 enables the functionality to modify both the session level description as well as the media level descriptions. However, the SDP API 153 SDK is designed such that knowledge of the structure of SDP for the purposes of normalization is minimized. SDP API 153 allows the operator to modify the SDP by:

- Adding a new parameter to the SDP—Example: SDP.addNew("a=parameter");
- Modifying an existing parameter in the SDP—Example: change "a=" for G.722 codec to VP8;
- Removing an SDP parameter—Example: Remove line containing "a=fmtp" from the SDP;
- Inserting an SDP parameter—Example: Insert a line into SDP after the line with "a=candidate";
- Modifying SDP media descriptions with the flexibility of modifying them at a particular media level;
- Adding an SDP media description—Adds media description as the last media description;
- Modifying an existing SDP media description;
- Removing an existing SDP media description—Example: Remove lines "a=ptime:20" from the audio media description only removes it at the specified media level;
- Inserting an SDP media description—Example: Insert a message media description so that it is first media Description in the SDP insertMediaDescription(1, "m=message 1234 sip:alice@10.10.10.100") Inserts the media description at the media-level 1.

In an embodiment of the invention, the SDP definition can also be modified on the client (e.g. Browser Client 142*a*) using a JavaScript API provided in a client SDK.

Further details of one possible implementation of the system and method of the present invention are described below with respect to FIGS. 2A-2D, in which Network-side controller 102 is implemented as the signaling engine component of WSBC 127, Client side controller 104 is implemented as RTC Client Signaling Controller 222, and protocol 106 is implemented in JavaScript Object Notation (JSON).

Figure 2A:
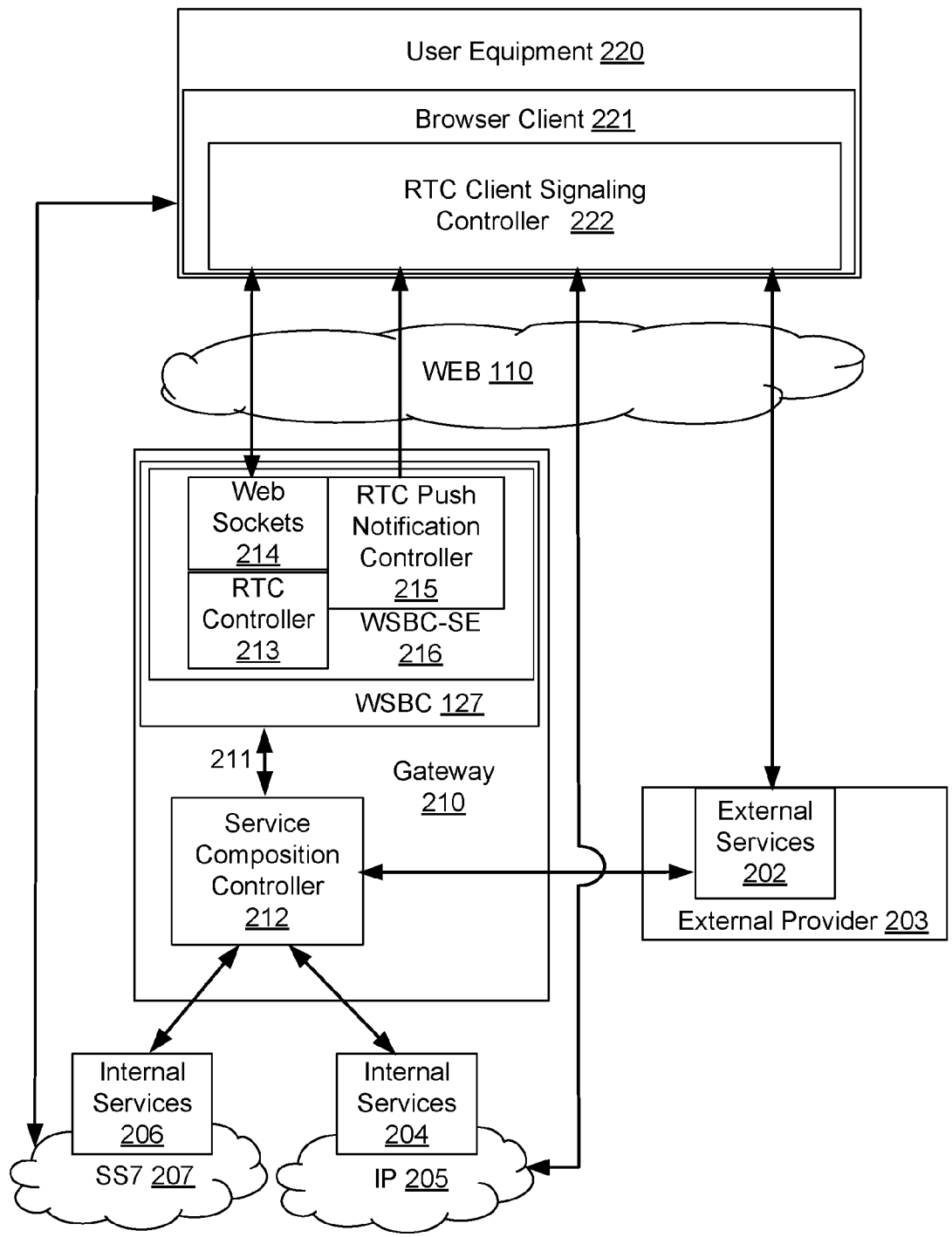
FIG. 2A shows a system for real-time communication signaling according to an embodiment of the present invention.

FIG. 2A shows a gateway 210 for real-time communication signaling according to an embodiment of the present invention. As shown in FIG. 2A, Gateway 210 includes RTC Controller 213, RTC Push Notification Controller 215, and Service Composition Controller 212. RTC Controller 213 and RTC Push Notification Controller 215 interact with RTC Client Signaling Controller 222 over the Web 110. RTC Controller 213 communicates internally 211 using SIP with Service Composition Controller 212. Service Composition Controller 212 mediates provision of Internal Services 206, 204 and External Services 202 of an External Provider 203. RTC Push Notification Controller 215, RTC Controller 213 and WebSocket Interface 214 together comprise an embodiment of the WSBC's signaling engine component WSBC-SE 216.

RTC Controller 213 provides scalable signaling over HTTP web-centric protocols for communicating over Web 110 with RTC Client Signaling Controller 222. RTC Controller 213 communicates with RTC Client Signaling Controller 222 via WebSocket interface 214. RTC Controller 213 provides a highly available, encapsulated front end interface to the web developer. The RTC Controller 213 terminates the Internet domain communications with the client-side by managing the WebSocket connections. The RTC Controller 213 also parses and processes the Internet domain communications. The RTC Controller 213 normalizes the Internet domain communications into an internal SIP for communication within Gateway 210. Thus, RTC Controller 213 communicates internally with Service Composition Controller 212 using a binary SIP.

Service Composition Controller 212 provides for service composition and orchestration across domains and different providers. The Service Composition Controller 212 also provides a unified layer to inject charging and policy control for differentiated service offerings. In an embodiment the functionality of Service Composition Controller 212 can be integrated in to a converged application server, for example ORACLE™ Communications Converged Application Server (OCCAS). Alternatively, the functionality of Service Composition Controller 212 can be integrated in to a service controller, for example ORACLE™ Communications Service Controller (OCSC).

Service Composition Controller 212 adopts and reuses existing internal communication services with support for different signaling protocols. Thus, for example, Service Composition Controller 212 can mediate: Internal Services 206 providing network telephony signaling using the SS7 protocol 207; and Internal Services 204 providing services using internet protocol 205.

Service Composition Controller 212 can also mediate the provision of external services 202 provided by an external service provider 203. Communication with external provider 203 can be conducted using a selected signaling protocol SIP, XMPP etc as required by the external provider 203. Services provided by external provider 203 can include web services provided over Web 110 to a browser client 221 on user equipment 220. Service Composition Controller 212 thus enables external providers of over-the-top ("OTT") services to provide OTT services to users/clients. The gateway system enables the external providers to make use of the real-time communication signaling over IMS. The users/clients can then access web applications provided by external providers from a browser on the user equipment.

The gateway system acts as the IMS proxy for both HTML5 and external providers by taking advantage of WebSocket technology, to enable and expedite the IMS deployment. The WebSocket Protocol defines a mechanism for fast, secure, two-way communication between a client and a server over the Web. Data is transferred over a full-duplex single socket connection, allowing messages to be sent and received from both endpoints in real-time. To establish a WebSocket connection, a specific, HTTP-based handshake is exchanged between the client and the server. If successful, the application-layer protocol is "upgraded" from HTTP to WebSocket, using the previously established TCP transport layer connection. After the handshake, HTTP is no longer used and data can be sent or received using the WebSocket protocol by both endpoints until the WebSocket connection is closed.

RTC Client Signaling Controller 222 is resident on user equipment 220 and manages multiplexing of signaling request/response for all client-side applications mediating communication with RTC Controller 213 over HTTP web-centric protocols. The particular HTTP protocol used can be defined as required by the particular native or external service, for example, JSON, XML, XMPP, Skype protocol etc. A client-side library of available protocols is provided as part of an SDK in order to extend the services to the client.

For telephony applications low power consumption by user equipment 220 is desirable. Accordingly RTC Client Signaling Controller 222 can be placed in standby operation when not involved in signaling. Moreover WebSocket protocol must be initiated from the client-side and is also responsible for keeping the connection alive. Thus, the RTC Client Signaling Controller 222 will shut down the WebSocket Connection when there is no traffic. RTC Push Notification Controller 215 can be used by RTC Controller 213 to "wake-up" RTC Client Signaling Controller 222 from the standby state in order to resume communication. The RTC Push Notification Controller 215 may, in some embodiments, also be used for other notifications such as call notifications, message notifications, and the like. In an alternative embodiment, the keepalive and pingpong capabilities of the WebSocket protocol may be used to maintain WebSocket connection.

RTC Push Notification Controller 215 includes a server-side HTTP connection based Push Notification to wake up the client-side signaling process. RTC Client Signaling Controller 222 can utilize any push notification mechanism and protocol effective for user equipment 220. For example, RTC Push Notification Controller 215 can utilize the SMS message system to activate RTC Client Signaling Controller 222, thereby causing RTC Client Signaling Controller 222 to reactivate the WebSocket connection with the RTC Controller 213.

Figure 2B:
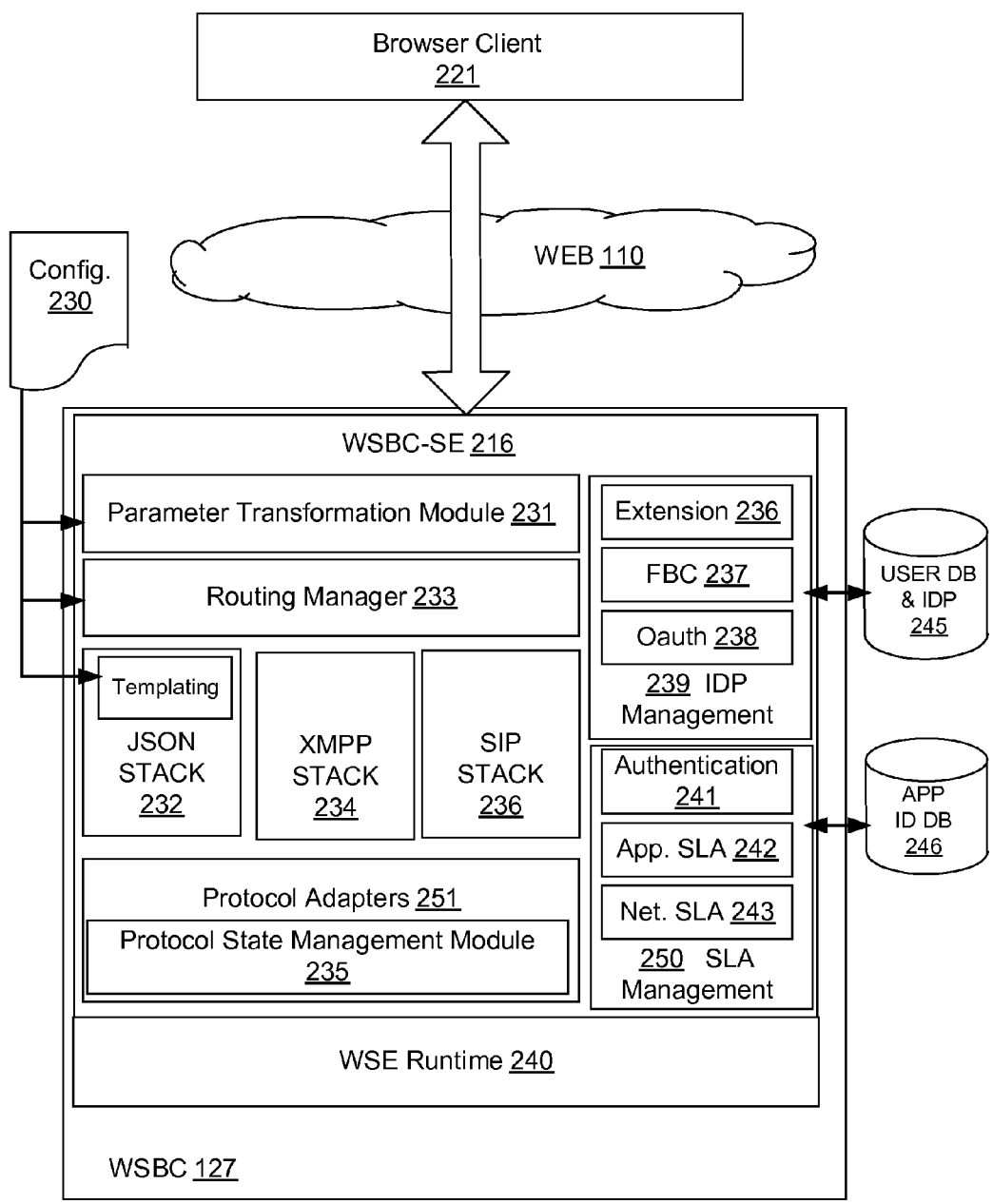
FIG. 2B shows a server-side signaling engine component of the WSBC according to an embodiment of the invention.

FIG. 2B shows a WSBC-SE 216 according to an embodiment of the invention. WSBC-SE 216 is deployed between the browser client 221 and the service composition controller 212 for exposing the internal and external services 206, 204, 202 to the client browser 221 (see FIG. 2A). WSBC-SE 216 enables the browser as a client for the network services and hence acts as a browser adapter. WSBC-SE 216 enables browser client management and ensures reliability of the service end to end (browser to network). WSBC-SE 216 provides a number of features to the carriers and enterprise customers as described below.

WSBC-SE 216 including a runtime module 240 supports multiple signaling protocols and ensures correct mapping of the signaling message using parameter transformation module 231 and correct routing of the messages based on routing profiles using routing manager 233. Parameter transformation, routing and JSON templating are all configurable using a configuration file 230.

WSBC-SE 216 performs protocol mapping between the selected client-side protocol and the network side protocol (SIP). For example, WSBC-SE 216 is adapted to receive a JSON message, parse the SDP information and map it to other supported protocols (SIP/XMPP). WSBC-SE 216 maintains a data definition for the format to parse to. When the JSON request is received at WSBC-SE 216, the transformation between the data definition and the JSON message structure must be implemented.

WSBC-SE 216 acts as a cross protocol signaling engine, and handles the protocol associated state as demanded by the protocol. When WSBC-SE 216 is acting as a cross-protocol gateway, for example, JSON/WebSocket to SIP, the SIP side of WSBC-SE 216 maintains the transaction and dialog state. WSBC-SE 216 includes a protocol state management module 235 which manages the protocol state and ensures state replication for reliability of message exchange. WSBC-SE 216 has the ability to manage enormous amounts of concurrent client connections in order to be able to scale to the applications and users on the web.

For developers, the key is to leverage existing knowledge and skill sets to minimize additional time and resources required by security features implementation. WSBC-SE 216 comes with APIs that support multiple platforms running under multiple protocols and a set of client libraries to facilitate smooth development process. WSBC-SE 216, thus, additionally provides an extensibility framework to extend the capabilities via protocol adaptors 251 and APIs for the web developers to call the WSBC-SE functions from their applications.

WSBC-SE 216 provides signaling adaption such that WSBC-SE 216 handles all the signaling between the browser client 221 and the network end point (SIP Proxy, PSTN Gateway for example). WSBC-SE 216 is adapted to handle the message exchange using several protocols over WebSocket (RFC 6455) including, for example: JSON based protocol via JSON Stack 232; XMPP sub-protocol via XMPP Stack 234; SIP sub via SIP Stack 236; BOSH (XEP-0124); and COMET (Bayeux protocol) (not shown). On the network/carrier side the web signaling engine supports translation into a suitable communication protocol or protocols (e.g. XMPP, SIP and the like). Thus, for example, on the network/carrier side, WSBC-SE 216 supports SIP (RFC 3261).

Security for real-time communication over the Web requires that the communicating endpoints be able to authenticate each other. While these end points are making calls through the signaling services, their identities are authenticated via an Identity Provider Management Module (IDP) 239 that supports OAuth 238, Facebook Connect (FBC) 237 and other Identity Protocols using extensions 236 (e.g. OpenID connect). IDP Management modules 239 interact with internal and/or external user database and identity servers 245.

WSBC-SE 216 thereby acts as an identity service that can attest the identity of the caller of the received request and map it to the "from" identity of the outbound call. For example, WSBC-SE 216 includes OAUTH module 238 which introduces security functions that authenticate and authorize the browser-based applications to interact with the network services. WSBC-SE 216 thereby provides service providers with the ability to control any third party partner's access and usage of its network capabilities.

Establishing real-time communication over the Web also utilizes verification of service level agreements (SLA) for the user and application. SLA Management module 250 includes an authentication module 241, as well as an application SLA module 242 and network SLA module 243 which communicate with internal and/or external databases 246 to verify that the communications are provided in conformance with the relevant service level agreements for the user and application.

In a particular embodiment, WSBC-SE 216 defines a JavaScript Object Notation (JSON) protocol that is used for exchanging information and to control the set up of media between a browser client 221 and WSBC-SE 216. JSON is a lightweight data-interchange format however other data-interchange formats may be used in alternative embodiments. The JSON protocol can be used on multiple transports (COMET, BOSH, and WebSocket). When used on WebSocket transport, the protocol is defined as a sub-protocol of the WebSocket protocol.

The JSON protocol (or alternative data-interchange format) defines the basic structure for the information transfer between the browser client 221 and WSBC-SE 216. The JSON protocol defines the minimum set of messages and state machinery necessary to implement the offer/answer model. The JSON protocol defines the message structure that accounts for the reliability (reconnect, retransmissions, timeouts etc) of the message. The JSON protocol also handles the necessary headers to function in multilevel secure environment (security headers).

WSBC-SE 216 also provides an internal routing manager 233 for the routing of the requests to the appropriate end nodes based on variety of parameters. There are multiple WSBC-SE instances (see FIG. 2C) and each instance is connected to the network node serving the functionality. The incoming requests (JSON messages, for example) have to be routed to the right application and instance. WSBC-SE 216 uses routing manger 233 to route incoming requests based on their origination and destination. WSBC-SE 216 provides functionality including performing look-ups and route requests for JSON to SIP, JSON to XMPP, SIP to XMPP, XMPP to SIP. Each route in the routing manager 233 has a routing profile. WSBC-SE 216 provides a default routing profile and additional routing profiles are configurable as needed or desired.

Figure 2C:
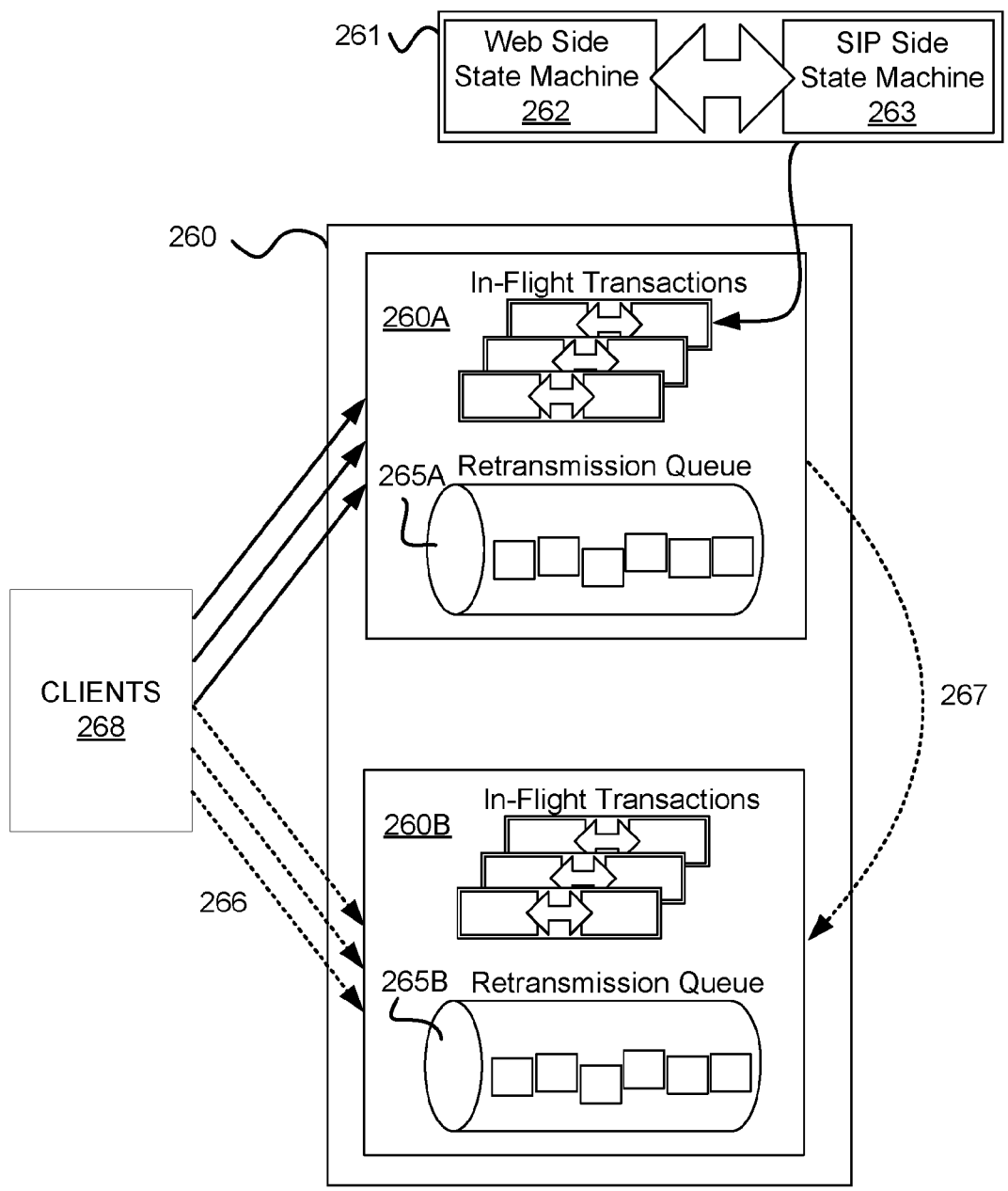
FIG. 2C shows an aspect of the server-side WSBC of FIG. 2B according to an embodiment of the invention.

FIG. 2C shows an aspect of WSBC-SE 216 of FIG. 2B according to an embodiment of the invention. WSBC-SE 216 maintains session control information, protocol state, dialog state, transaction state. WSBC-SE 216 provides for state maintenance and session state mapping across protocols. WSBC-SE 216 also enables hooks into the media session state. WSBC-SE 216 also maintains the SDP Agent information. WSBC-SE 216 operates to ensure reliable message exchange with clients 268.

WSBC-SE 216 ensures reconnection of clients due to failover or loss of connectivity. Clients and servers use an implicit sequence numbering protocol for the message transported by the connection. Clients and the servers each maintain their own sequence number. Both client and server acknowledge their receipt of messages by sending acknowledgement ("ack") messages. As per the protocol, an ack message indicates that the message has reached the destination (as well as all the messages lower than that sequence). Similarly an error message shall be defined (as in the JSON protocol section) to indicate that the message with a sequence number has met with an error. Retransmission Queue 265A, 265B allows for retransmission of messages for which there is an error or lack of acknowledgement.

One way in which WSBC-SE 216 maintains reliability is to keep the relevant conversation state redundant across different servers 260A, 260B having instances of WSBC-SE 216. WSBC-SE 216 provides for state maintenance and session state mapping across protocols. The relevant conversation state includes a Web Side State Machine 262 and SIP Side State Machine 263 for each In-Flight Transaction 260. WSBC-SE 216 maintains the session states (both client and server side state) in the cache. In order to ensure reliability, the cached copy of the state machines is duplicated on several servers. Additionally retransmission queue 265A, 265B is duplicated across servers 260A, 260B. WSBC-SE 216 uses coherence for state storage and management. If a server, for example server 260A cannot be contacted due to a network failure WSBC-SE 216 ensures that the state is retrieved from another active server 260B as shown by the dashed arrows 267, 266.

Figure 2D:
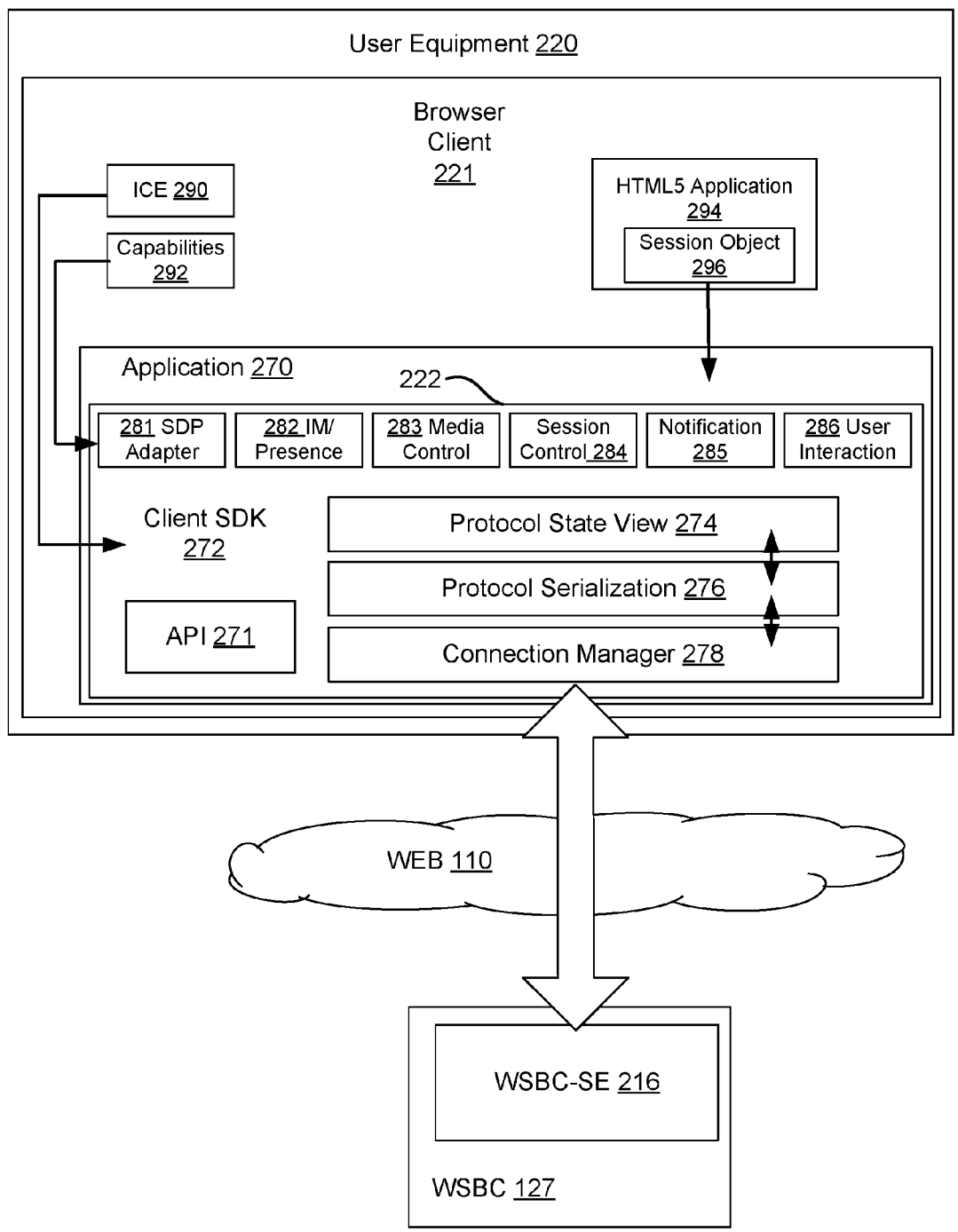
FIG. 2D shows a client-side RTC signaling controller according to an embodiment of the invention.

FIG. 2D shows an implementation of a client-side RTC signaling controller 222 as shown in FIG. 2A according to an embodiment of the invention. In an embodiment client-side RTC signaling controller 222 is implemented as part of an application 270 running on a browser client 221 (for example a JSS/CSS/HTML5 application). Application 270 is resident on user equipment 220 such that RTC signaling controller 222 manages multiplexing of signaling request/response for all client-side applications mediating communication with WSBC-SE 216. (see FIGS. 2A and 2B). Application 270 includes IM/presence module 282, media control module 283, notification module 285, and user interaction module 286.

In an embodiment application 270 is a JavaScript Application. Application 270 operates at a high level without having to deal with peer connection directly. The browser client 221 is stateless and contains as little of the implementation of the transport establishment code as possible. Browser client 221 identifies the capabilities 292 of the browser client 221 and user equipment 220 for streaming media. The capabilities 292 are provided to the SDP adapter 281 of the application 270. SDP adapter 281 provides a description of streaming media initialization parameters—a session profile—suitable for streaming media to the browser client 221 running on user equipment 220.

A client-side library of available protocols is provided as part of a Client SDK 272 in order to extend the services to the browser client 221. The particular HTTP protocol used can be defined as required by the particular native or external service, for example, JSON, XML, XMPP, Skype protocol etc. In a preferred embodiment a JSON protocol is used for communication between client-side RTC signaling controller 222 and WSBC-SE 216 as described above.

Protocol serialization 276 interacts with protocol state view 274 and connection manger 278 to communicate with WSBC-SE 216 over Web 110. Session Control 284 establishes reliable connection with WSBC-SE 216. This session can be used by the application 270 to create or invoke other objects.

RTC signaling controller 222 comprises a JavaScript SDK 272 which provides the functions necessary for application 270 to manage server connections (connection establishment, teardown via WebSocket). The JavaScript SDK 272 provides functions necessary to handle the state machine and functions to deal with interoperability issues. For example, the JavaScript SDK 272 of application 270 provides functions to create messages or insert messages into the state machine. The JavaScript SDK 272 also provides functions for the client to monitor connection health, including the ability to reconnect in case of stale connections and the ability to synchronize state from the server and add modified state back to the server.

JavaScript SDK 272 also provides an application programming interface (API) 271 which can modify and optimize media parameters, session description protocol (SDP), etc. The API 271 abstracts out complex functionality and provides API to deal with the real-time communication session, Call etc. The API 271 provides the ability to handle call states, media states, subscriptions and notifications.

In operation, HTML5 applications 294 access the JavaScript APIs to get access to various communication objects as defined in the API 271. An HTML5 application 294 will create a session object 296. The session object 296 acts as browser side representation of the communication. From session object 296, application 270 can create different communication objects like Call, Subscription etc. The HTML5 application can listen on the callbacks from the objects to receive incoming calls, notifications, media in the call, state changes etc.

The Interactive Connectivity Establishment (ICE) draft, developed by the IETF's MMUSIC working group, provides a framework to unify the various NAT traversal techniques. ICE defines a standardized method for clients to determine what type of firewall(s) exist between clients and determine a set of IP addresses by which clients can establish contact. When an ICE-enabled client (the initiator) wishes to communicate with another device (the responder), it first collects information on addresses where the client can receive IP traffic. A key benefit that ICE provides is the ability to unify the information provided by these various sources of IP address information to create as many paths as possible by which the endpoints can be reached.

For real-time communication over the Web, the ICE state machine 290 is maintained by the browser client 221. When the browser client 221 reloads, the application 270 has no knowledge of the ICE Candidates and is forced to perform ICE restart. In order to avoid this, application 270 can save this information in WSBC-SE 216. When the initial ICE negotiation finishes, the browser client 221 sends the nominated ICE candidate pair of IP addresses to the application 270 which saves this information in WSBC-SE 216. When the browser client 221 reloads, the application 270 will fetch the nominated ICE candidate information from the server, and then send it to the browser client 221. This will tell the browser client 221 to use these candidates for media transfer. Since the browser client 221 has kept the local nominated ICE candidate alive all the time, as long as the remote side has not released the call, the transfer will succeed.

Although the invention has been described above with respect to communication services in a telecommunications network, the invention also finds application in any situation where it is necessary or desirable to provide real-time communication signaling.

The present invention may be conveniently implemented using one or more conventional general purpose or specialized digital computer, computing device, machine, or microprocessor, and/or network of same, programmed according to the teachings of the present disclosure.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. The transmission may include a plurality of separate transmissions. In accordance with certain embodiments, however, the computer storage medium containing the instructions is non-transitory (i.e. not in the process of being transmitted) but rather is persisted on a physical device.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A system for integrating a telecommunications network with HTML5 environments, comprising:
   a network element, provided as part of a telecommunications network, that includes an application programming interface (API);
   an HTML5 application that sends a communication request to the network element, for a call to a remote client;
   wherein the network element operates to
      provide real-time communication signaling between the HTML5 application and the remote client,
      modify the communication request using the API to force one or more media streams of the call to pass through the network element, and
      exercise control over the one or more media streams.

2. The system of claim 1, wherein the telecommunications network is an IP Multimedia Subsystem (IMS) network that delivers IP multimedia services.

3. The system of claim 2, wherein the network element acts as a proxy call session control function (P-CSCF) for the HTML5 application to the IMS network.

4. The system of claim 1, wherein the control over the one or more media streams includes lawful interception.

5. The system of claim 1, wherein the network element further operates to perform at least one of media transcoding and security conversion.

6. The system of claim 1, wherein the remote client is a SIP user agent, and wherein the network element translates between a web-centric protocol used by the HTML5 applications and SIP protocol.

7. The system of claim 6, wherein the network element terminates ICE negotiation from the HTML5 application.

8. A computer-implemented method for integrating a telecommunications network with HTML5 environments, comprising:
   configuring a network element, as part of a telecommunications network, that includes an application programming interface (API);
   sending a communication request from an HTML5 application to the network element, for a call to a remote client;
   providing real-time communication signaling between the HTML5 application and the remote client;

modifying the communication request using the API to force one or more media streams of the call to pass through the network element; and exercising control over the one or more media streams.

9. The method of claim 8, wherein the telecommunications network is an IP Multimedia Subsystem (IMS) network that delivers IP multimedia services.

10. The method of claim 9, wherein the network element acts as a proxy call session control function (P-CSCF) for the HTML5 application to the IMS network.

11. The method of claim 8, wherein the control over the one or more media streams include lawful inception.

12. The method of claim 8, wherein the network element further operates to perform at least one of media trans-coding and security conversion.

13. The method of claim 8, wherein the remote client is a SIP user agent, and wherein the network element translates between a web-centric protocol used by the HTML5 applications and SIP protocol.

14. The method of claim 13, wherein the network element terminates ICE negotiation from the HTML5 application.

15. A non-transitory computer readable storage medium, including instructions stored there on which, when executed by a computer, cause the computer to perform the steps comprising:

configuring a network element, as part of a telecommunications network, that includes an application programming interface (API);

sending a communication request from an HTML5 application to the network element, for a call to a remote client;

providing real-time communication signaling between the HTML5 application and the remote client;

modifying the communication request using the API to force one or more media streams of the call to pass through the network element; and exercising control over the one or more media streams.

16. The non-transitory computer readable storage medium of claim 15, wherein the telecommunications network is an IP Multimedia Subsystem (IMS) network that delivers IP multimedia services.

17. The non-transitory computer readable storage medium of claim 16, wherein the network element acts as a proxy call session control function (P-CSCF) for the HTML5 application to the IMS network.

18. The non-transitory computer readable storage medium of claim 15, wherein the control over the one or more media streams include lawful inception.

19. The non-transitory computer readable storage medium of claim 15, wherein the network element further operates to perform at least one of media trans-coding and security conversion.

20. The non-transitory computer readable storage medium of claim 19, wherein the remote client is a SIP user agent, and wherein the network element translates between a web-centric protocol used by the HTML5 applications and SIP protocol.

* * * * *